G. W. VOUGHT.
MOLD FOR MAKING TILES.
APPLICATION FILED DEC. 11, 1919.

1,365,753.

Patented Jan. 18, 1921.

INVENTOR
George W. Vought
BY
Stauffer & Barland
ATTORNEYS

UNITED STATES PATENT OFFICE.

GEORGE W. VOUGHT, OF HOLLIS, NEW YORK.

MOLD FOR MAKING TILES.

1,365,753.     Specification of Letters Patent.    Patented Jan. 18, 1921.

Application filed December 11, 1919. Serial No. 344,055.

*To all whom it may concern:*

Be it known that I, GEORGE W. VOUGHT, a citizen of the United States, residing at Hollis, in the county of Queens, State of New York, have invented new and useful Improvements in Molds for Making Tiles, of which the following is a specification.

This invention relates to a mold which is essentially adapted for forming hollow concrete tiles, and it is designed to include means for permitting the core to be readily pulled out of the concrete.

The main object of the invention is to provide the core with an elastic cover, which on account of its resiliency will stretch when pulled out of the concrete decreasing the thickness and at the same time the area of the core so that it can be easily withdrawn.

Another object of the invention is to provide the mold sections with an elastic lining which when the mold is actuated to remove it from the concrete, the rubber will tension itself and by reason of its inherent elasticity it will fly off the surface of the concrete to release the mold.

Another object of the invention is to mold a tile of concrete and provided with a series of holes or cells extending longitudinally through the tile.

The invention resides more particularly in the combinations hereinafter described and claimed, reference being made to the accompanying drawing in which:

Figure 2:
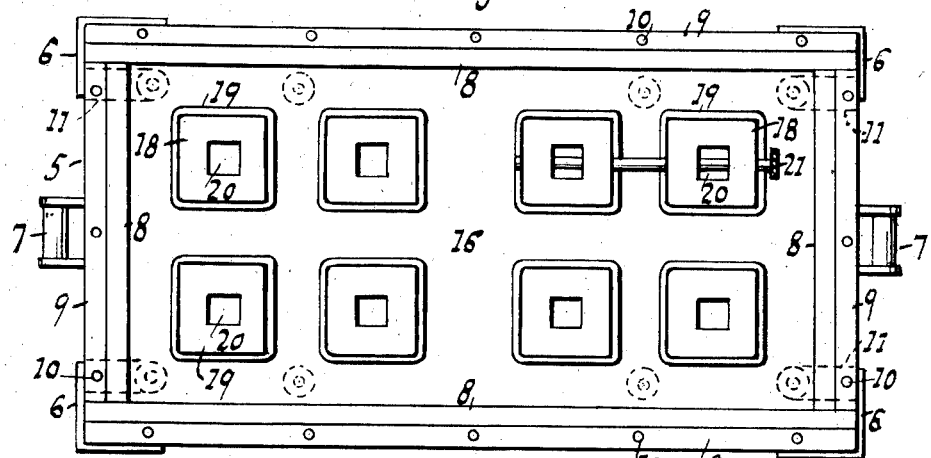
Fig. 2 is a plan view of the same.

In the drawing the numeral 5 designates a mold, or box which includes side and end sections having an open top and bottom. The sections are preferably made of wood and are fastened together by means of a series of angle irons 6 co-acting with the corners of the sections, best seen in Fig. 2. The mold is rectangular and it has handles 7 fastened to the end boards for lifting the mold.

The inner surface of each mold section is lined with a sheet of vulcanized rubber 8 with top and bottom fastened by means of strips 9 to the sections. Each strip is secured by nails 10 in a mortise located in the top and bottom section thus clamping the upper and lower end portions of the rubber therebetween to securely hold the sheet onto the section.

Figure 1:
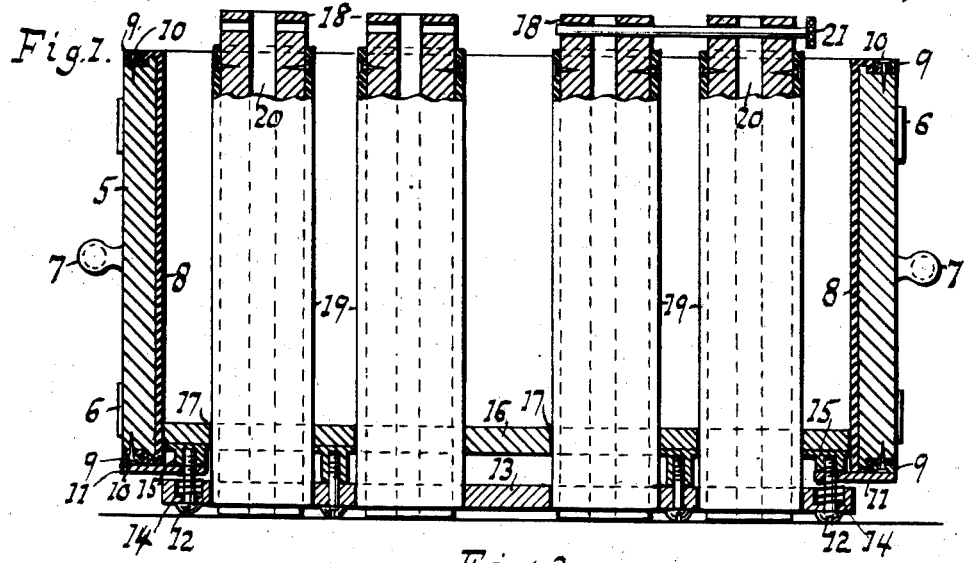
Figure 1 represents a sectional side elevation of a mold embodying this invention.

The mold is supported on brackets 11 each being slidingly mounted on the stem of a screw 12 and secured to a pallet 13 arranged below the bottom of the mold. The stems of the end screws have coil springs 14 disposed thereon, as indicated in Fig. 1, to cushion the brackets, and serve as a buffer for the mold. The screws engage hubs or sleeves 15 secured to an upper pallet 16 thereby holding the two pallets together.

The pallets are provided with a series of openings 17, one being in a line with and in register with the other. As shown in the drawing the pallets are vertically spaced from each other and a series of cores 18, of the same shape as the openings are supported on a floor or base. The lower portions of the cores are inserted in the openings so as to prevent them from wabbling or shifting and to keep them symmetrically spaced. Each core is preferably hollow to reduce the suction when withdrawing it from the mold. On the outside of the core is arranged a rubber cover or envelop 19 which is fastened at the top by means of nails 20 to the core. The rubber surrounds the core and sets tightly against the outer surface thereof. The lower end of each rubber cover is not fastened to allow the cover to stretch longitudinally when the core is drafted. A handle consisting of a rod 21 inserted through holes in the upper portion of one or more cores can be utilized to lift the cores from the mold.

Figures 3, 4:
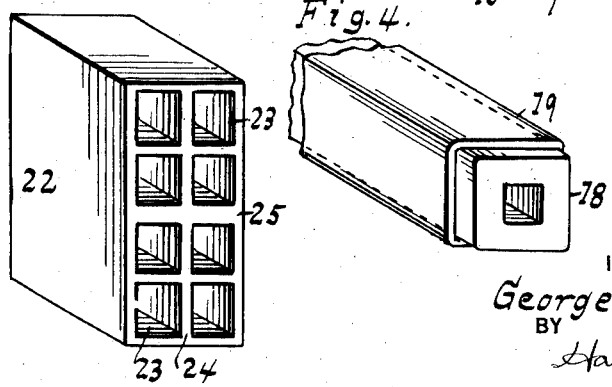
Fig. 3 is a perspective view of a tile.
Fig. 4 is a perspective view of the lower portion of a core.

When it is desired to mold a hollow tile of the shape shown in Fig. 3, grout consisting of one part of cement, three and one-fifth parts of sand, two parts of gravel and one and one-fifth parts of water is mixed and poured into the mold to pack or tamp about the cores. Heretofore it has been the custom to allow the concrete to remain in the mold for about eight hours in order to let it set before removing the cores. In the present invention the rubber covered cores and mold can be withdrawn from the mixture in about twenty minutes, obviating the use of a large number of molds and waiting until the cement sets before again using the mold. The rubber being attached to the mold walls adhesion of the concrete to the rubber causes it to stretch when the mold is removed making the walls somewhat narrower and creating a space between the rubber and surface of the concrete to facilitate removal of the mold. After the mold or core is withdrawn, the elastic returns to its former state to increase the thickness of the walls or the transverse area of the cores.

It will be readily understood, that the tiles can be made of any size or configuration and the cores to form the openings or cells can be made circular in cross section, and the same result obtained As shown in Fig. 3 of the drawing, the rectangular hollow concrete tile 22 is made of the mixture stated above. It has two rows of holes or cells 23 extending longitudinally through the tile to form air spaces, the holes being divided by walls 24 of the same thickness. The center wall 25 is thicker than the other walls in order to furnish means for bonding the next tile to it, as is well known in building a wall.

I claim:

1. A hollow tile shaping device comprising a mold, and a core having an elastic rubber cover.

2. A hollow tile shaping device comprising a mold, and a core having an elastic rubber cover fastened at one end of the core.

3. A mold for shaping hollow tiles comprising a box having an elastic rubber lining, and an elastic core arranged in the box.

4. A mold for shaping hollow tiles comprising a box having side and end sections, an elastic rubber lining secured to the sections, and a plurality of cores each having an elastic rubber cover arranged in the mold.

In testimony whereof I have hereunto set my hand in the presence of two subscribing witnesses.

GEORGE W. VOUGHT.

Witnesses:
SAMUEL LEWIS,
WILLIAM MILLER.